(12) United States Patent
Levi (10) Patent No.: US 6,427,889 B1
(45) Date of Patent: Aug. 6, 2002

(54) LADDER RACK FOR HI BAY VANS

(76) Inventor: Avraham Y. Levi, 757 Decorah La., St. Paul, MN (US) 55120

( * ) Notice: Subject to any disclaimer, the term of this patent is extended or adjusted under 35 U.S.C. 154(b) by 0 days.

(21) Appl. No.: 09/758,729

(22) Filed: Jan. 11, 2001

(51) Int. Cl.[7] ............................................... B60R 9/042
(52) U.S. Cl. ........................ 224/315; 224/310; 414/462
(58) Field of Search ................................. 414/462, 546, 414/680; 224/310, 315, 324

(56) References Cited

U.S. PATENT DOCUMENTS

| | | | | |
|---|---|---|---|---|
| 3,058,607 A | * | 10/1962 | Kiley | ........................ 414/462 |
| 3,963,136 A | * | 6/1976 | Spanke | ........................ 214/450 |
| 4,808,056 A | * | 2/1989 | Oshima | ........................ 414/462 |
| 5,058,791 A | * | 10/1991 | Henrizuez et al. | .......... 224/310 |
| 5,297,729 A | | 3/1994 | Levi | |
| 5,297,912 A | * | 3/1994 | Levi | ............................ 414/462 |
| 5,360,150 A | * | 11/1994 | Praz | ............................ 224/310 |
| 5,398,778 A | * | 3/1995 | Sexton | ........................ 187/127 |
| 6,092,972 A | * | 7/2000 | Levi | ............................ 414/462 |
| 6,099,231 A | * | 8/2000 | Levi | ............................ 414/462 |

FOREIGN PATENT DOCUMENTS

FR 2399366 * 4/1979 .................. 414/462

* cited by examiner

Primary Examiner—Kathy Matecki
Assistant Examiner—Sang K Kim
(74) Attorney, Agent, or Firm—Nikolai & Mersereau, P.A.; Thomas J. Nikolai (57) ABSTRACT

A rotatable ladder rack assembly for use on motor vehicles incorporates an improved lever mechanism for transferring a ladder load from the roof of the vehicle to a location alongside the vehicle and which allows the ladder rack assembly to be used on hi bay vans. A rotatable coupler is journaled for rotation about the ladder rack's connector rod and includes a slot of a predetermined arc length into which fits a pin passing diametrically through the connector rod. A lever of the first class is designed to pivot about a fulcrum and the shorter lever arm is linked to the rotatable coupler for applying a torque to the connector rod via the pin.

11 Claims, 8 Drawing Sheets

LADDER RACK FOR HI BAY VANS

BACKGROUND OF THE INVENTION

I. Field of the Invention

This invention relates generally to vehicle ladder racks for use in loading and unloading heavy ladders onto and from the roof of a motor vehicle, and more particularly to such ladder racks especially adapted for use on so-called "hi bay vans" where the roof of the van is sufficiently high to pen-nit an adult to stand upright within the body of the van.

II. Discussion of the Prior Art

In my earlier U.S. Pat. 5,297,912 (the '912 patent), the contents of which are hereby incorporated by reference as if set forth in full herein, I describe a motor vehicle ladder rack for use on conventional sports utility vehicles (SWV's) and vans of the type commonly sold in the United States. Such vehicles may typically have a roof height of only about 6.5 feet (1.98 meters). Here, my earlier disclosed embodiment of the '912 patent works very well in that an adult can readily reach and manipulate the handle 58 of the crank used to rotate the connector rod 50 throughout its entire range of motion. In the case of hi bay vans, however, where the roof height is typically about 9 feet (2.75 m), not only must the ladder rack allow for a greater drop-down distance to facilitate ease of removal and loading of ladders from a position alongside of the vehicle, but also, the actuating lever used in raising and lowering the ladders must remain reachable over its entire range of travel. In the ladder rack product built in accordance with the disclosure in the '912 patent, the crank 56 used to rotate the connector rod 52 for moving a ladder load to and from its stowed position atop the vehicle's roof 12 had to swing through an arc of about 180°. While this did not present a problem for ladder racks on conventional vans, with hi bay vans, the crank on my prior art type ladder rack would be out of reach for most persons at the start and end of the 180° swing where the crank handle 58 is generally horizontal.

A need therefore exists for an improved ladder rack actuating mechanism that is usable with ladder rack assemblies mounted on hi bay vans and which allow a person to readily move ladders from a stowed disposition on the vehicle's roof to a deployed location alongside the vehicle and back again in an economically convenient and safe manner.

In accordance with the present invention, I have devised an actuating mechanism for rotating the connector rod of my ladder rack which can be readily reached and held throughout the entire range of movement of the ladder load between its stowed and deployed states, even when mounted on a hi bay style vehicle.

SUMMARY OF THE INVENTION

The present invention provides an improved apparatus for facilitating the loading and unloading of a ladder from the roof of a motor vehicle and comprises first and second four-bar linkage assemblies where each includes a stationary bar member adapted for attachment to the roof of a motor vehicle in parallel, spaced-apart relation so as to extend transversely to the longitudinal axis of the motor vehicle and a moveable bar member comprising a ladder rest pivotally coupled to the stationary bar member by a pair of rigid links of unequal length. The pair of rigid links are sized and positioned such that rotation of one of the pair of rigid links on each of the first and second 4-bar linkage assemblies results in the moveable bar member that comprises the ladder rest to move between a first disposition which is generally parallel to the roof of the vehicle and a second disposition aligned with and spaced from one side of the vehicle. A connector rod extends longitudinally between the first and second 4-bar linkage assemblies and is journaled for rotation in the stationary bar members of each of the 4-bar linkage assemblies. The connector rod is operatively coupled to the one of the pair of rigid links. The connector rod is adapted to be driven by a mechanism that includes a lever that is pivotable about a fixed fulcrum to define lever arms of lengths $L_1$ and $L_2$ where $L_1$ is much greater than $L_2$. A rotatable coupler is journaled for rotation about the connector rod and has a radially extending arm of length $L_3$ pivotally joined by a link member to an end portion of the lever arm $L_2$. The ratio of $L_3$ to $L_2$ increases the angular travel of the rotatable coupler to be about double that of the driving lever. The rotatable coupler cooperates with the connector rod to apply a torque to the connector rod only when a force is applied to the lever arm, $L_1$, to pivot the lever through a predetermined angle which is less than about 45° from the vertical. In that the ladder load may be raised and lowered from the roof of the vehicle by manipulating the lever through an angle of about 90° centered about the vertical, it always remains well within reach of an adult worker.

DESCRIPTION OF THE DRAWINGS

The foregoing features, object and advantages of the invention will become to those skilled in the art from the following detailed description of a preferred embodiment, and especially when considered in conjunction with the accompanying drawings in which like numerals in the several views referred to in corresponding parts.

DESCRIPTION OF THE PREFERRED EMBODIMENT

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof Said terminology will include the words above specifically mentioned, derivatives thereof, and words of similar import.

Figure 1:
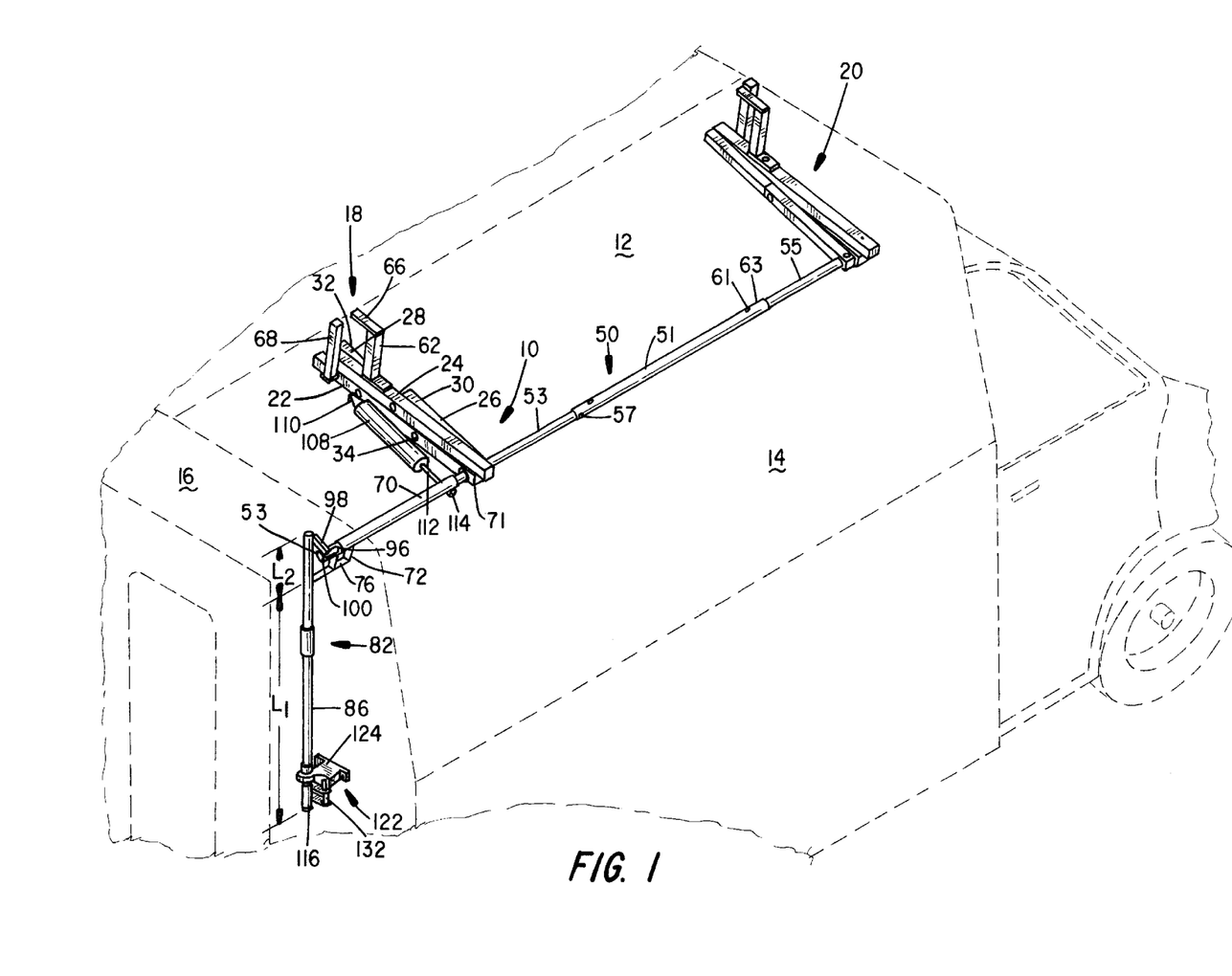
FIG. 1 is a partial perspective view of a hi bay van on which the ladder rack of the present invention is installed.

Referring first to FIG. 1, there is indicated generally by 10 the ladder rack mechanism having an actuator lever mechanism constructed in accordance with the preferred embodiment of the invention. The ladder rack assembly is shown as being mounted on the roof 12 of a hi bay van type motor vehicle. As explained above, hi bay vans have a body that is sufficiently high to permit an adult to stand therein. As such, the roof height of the vehicle from the ground may typically be about 9 feet (2.75 m). The function of the rotational ladder rack is to transport a ladder load from a stowed disposition atop the roof 12 of the vehicle to a deployed or lowered position along the side 14 of the van and at an elevation that will allow a workman to conveniently remove a ladder therefrom and carry it away.

The ladder rack assembly 10 includes a pair of 4-bar linkages 18 and 20. The front 4-bar linkage assembly 20 is identical to the rear one 18 and each includes a first rigid tube 22 of generally rectangular cross-section that is suitably fixedly attached to the roof 12 or to a support brace that may be affixed to the vehicle's roof A second tubular bar 24, also of rectangular cross-section comprises the moveable ladder rest and it is coupled to the member 22 by a pair of linked members 26 and 28. The link 26 is pivotally secured to the member 24 by a pin 30. The link 28 is pivotally joined to the ladder rest member 24 by a pin 32 and to the lower stationary bar 22 by a pin 34.

As is described in my earlier '912 patent, the relative lengths of the links 26 and 28 and their points of attachment determine the path of travel of the moveable ladder rest 24.

The rear 4-bar linkage 18 and the front 4-bar linkage 20 are joined by a connecting rod assembly 50. More particularly, a first connector rod 53 is journaled for rotation in a sleeve-bearing disposed in the right-most end of the stationary bar 22. In a similar fashion, a connector rod 55 is journaled in bearings disposed in the rightmost end of the stationary member of the front 4-bar linkage 20. To accommodate different spacings between the front and rear 4-bar linkage members, the connector rods 53 and 55 are telescopingly received within an intermediate tube 51 and fastened thereto by thru-bolts as at 57, 59, 61 and 63.

In accordance with the present invention, the connector rod 53 extends rearward beyond the stationary member 22 and beyond the rear end 16 of the vehicle. It fits within a concentrically disposed tubular strut 70 that is affixed at its forward end to the stationary bar member 22 by a plate 71 that is welded to the cylindrical tube 70 and secured to the stationary tube 22.

Figure 2:
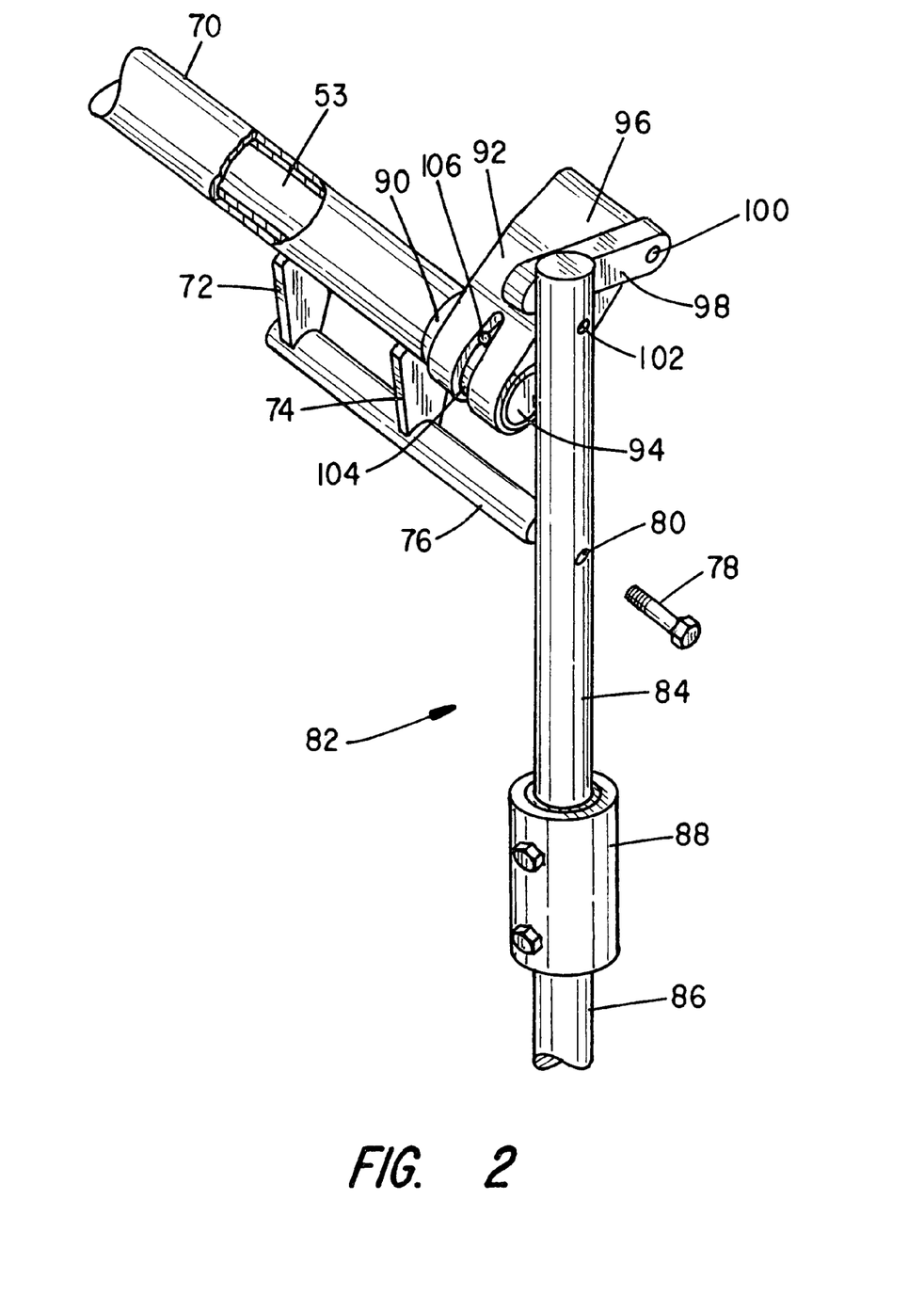
FIG. 2 is a partial perspective view showing the rotational coupler and lever arrangement used to rotate the connector rod of the ladder rack assembly.

Next, with reference to FIG. 2, welded to the outer surface of the tube 70 are stand-off members 72 and 74 which support a fulcrum member 76. The fulcrum member 76 is threaded to accept a bolt 78 that passes through a transversely extending bore 80 formed in a lever assembly indicated generally by 82. The lever assembly is segmented into an upper member 84 and a lower member 86, the two being joined by a tubular coupling member 88 that allows for limited adjustment in the alignment of the members 84 and 86, should this become necessary due to a need to clear any rearwardly projecting obstructions such as door handles or the like on the vehicle.

A short portion of the connector rod member 53 extends beyond the rear-most end 90 of the tube 70 and journaled for rotation about that extending end segment of connector rod 53 is a rotatable coupler 92. The rotatable coupler 92 includes a cylindrical bore into which is fitted sleeve bearings 94 for journaling the end of the connector rod 53. The body of the rotatable coupler containing the cylindrical bore also includes a radially extending arm 96 which is pivotally joined to the upper end of the lever member 84 by a linkage 98. Pivot pins as at 100 and 102 join the linkage 98 between the arm 96 of the rotational coupler 92 and the lever member 84.

With continued reference to FIG. 2, the rotational coupler 92 is seen to include a circumferentially extending slot 104 of a predetermined arc length. Visible in the slot 104 is a metal pin 106 that passes diametrically through the connector rod 53 with a tight friction fit. As will be further explained in greater detail, the portions of the pin extending beyond the cylindrical surface of the connector rod 53 cooperate with the ends of the slot 104 to apply torque to the connector rod when transporting the ladder load between the stowed and deployed positions thereof.

Referring once again to FIG. 1, an oil filled cylinder 108 is pivotally joined at one end 110 to the stationary bar member 22 and the piston rod 112 thereof is pivotally coupled to a lever arm 114 welded to the connecting rod 53. The oil filled cylinder 108 is preferably of the type described in my co-pending application Ser. No. 09/298,624, filed Apr. 23, 1999, the contents of which are hereby incorporated by reference.

With attention now being directed to the lever assembly 82 in FIG. 1, it can be seen that the length of the lever arm $L_1$ between the end of the handle grip 116 and the fulcrum point 78 is much, much greater than the length $L_2$ of the lever arm between the fulcrum point 78 and the pivot point 102 to which the linkage 98 is affixed.

To better understand the operation of the present invention, reference is next made to the sequence of drawings of FIGS. 3A–3D. Beginning with FIG. 3A, the moveable ladder rest 24 is in its stowed position and one rail of the ladder (not shown) is captured between the posts 62 and 68 and the cover plate 66. The other rail of the ladder rests upon the upper surface of the moveable member 24. The lever assembly 82 is oriented vertically such that the hand grip 116 will be in easy reach of a workman wishing to deploy the ladders from the top of the truck or van. To do so, he grasps the hand grip 116 and forces the lever 82 in the direction of the arrow 118. This causes the lever to pivot about the fulcrum 78 and to rotate the rotational coupler 92, via the connecting link 98. As the rotational coupler attempts to rotate about the connector rod 53, the pin 106 is engaged by the end edge of the slot 104, causing a large torque to be applied to the connector rod, via the pin 106. The lever action of the lever assembly 82 greatly amplifies the force applied by the link 98 to the arm 96 of the rotational coupler 92. As the lever is moved in the direction of arrow 118, the connector rod 53 rotates the linkage 26 clockwise, which thereby lifts the moveable ladder rest member 24 to the position shown in FIG. 3B. The rotation of lever 82 of about 45° will cause the coupler 92 to rotate about 90°. As the load passes through dead center, gravity acts on the load to continue the rotation of the connector rod 53, whereby the pin 106 traverses the slot 104 as the hydraulic cylinder 108 applies a retarding force to the connector rod preventing a sudden drop of the load. Thus, the load descends to the position shown in FIG. 3C when the lever handle has only been shifted about 45° from its straight up and down position shown in FIG. 3A. With the ladders lowered to the position shown in FIG. 3C, a workman can readily remove them from the rack assembly and carry them to a jobsite.

Figure 3A:
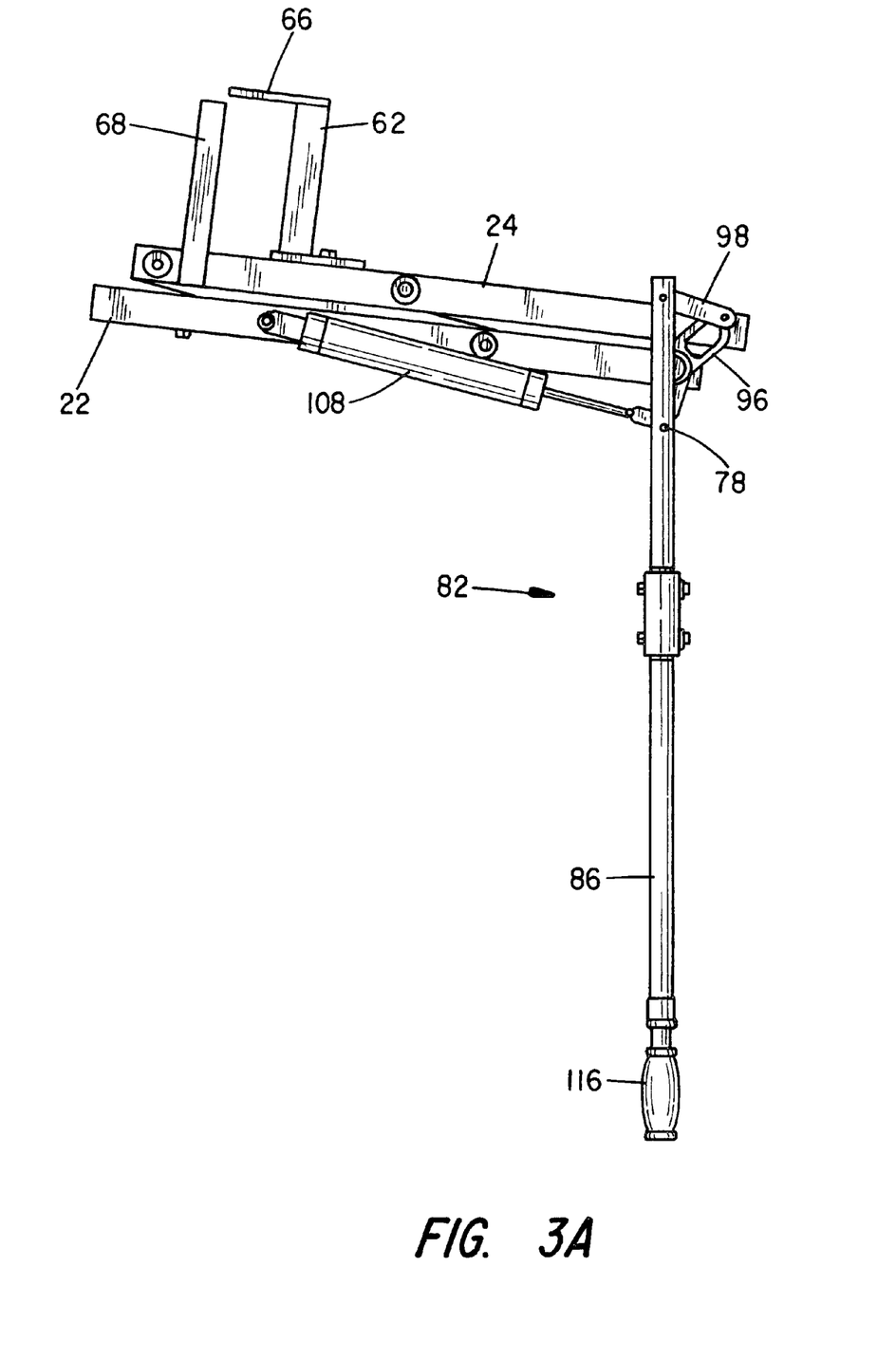
FIG. 3A, 3B, 3C and 3D are each end views of the ladder rack in its stowed position; when moving to its unload position; when in its down position and when returning to its stowed position, respectively.
Figure 3B:
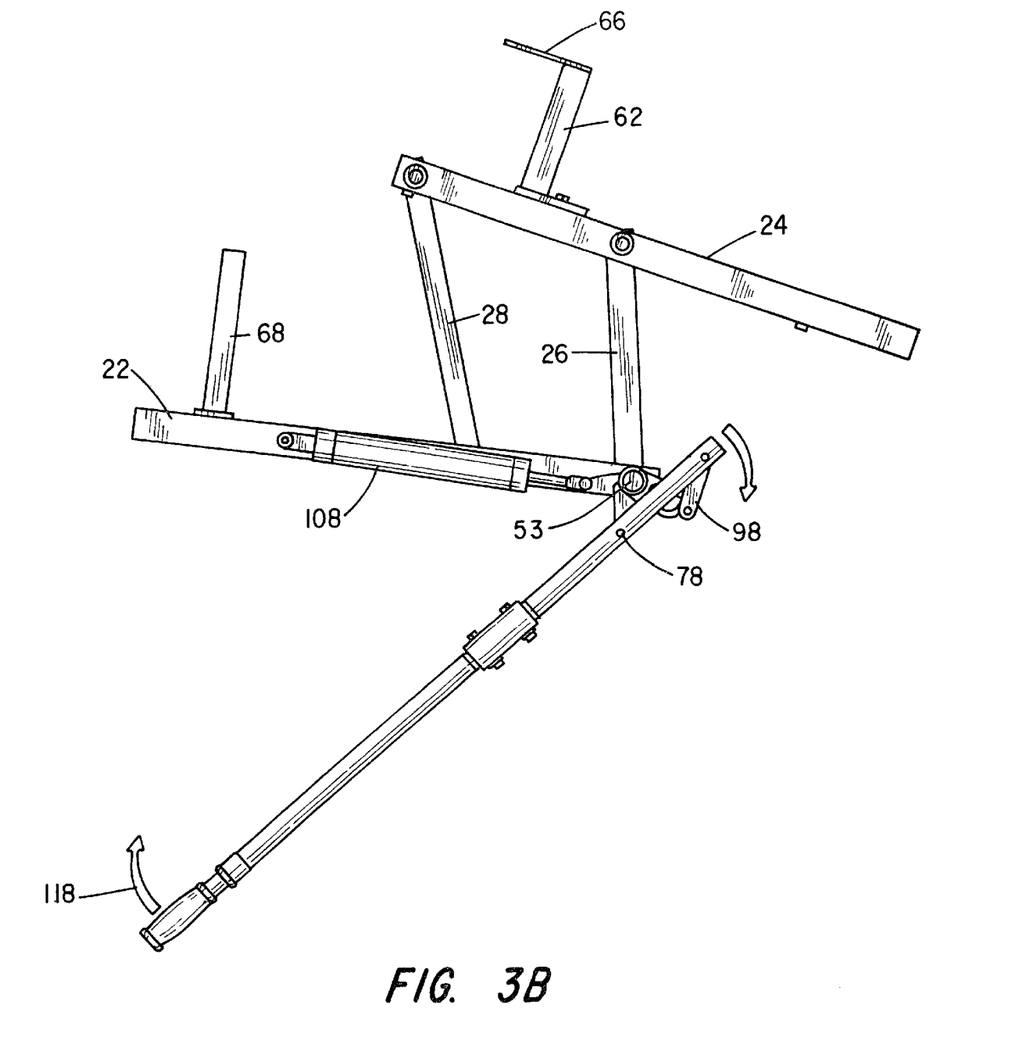
Figure 3C:
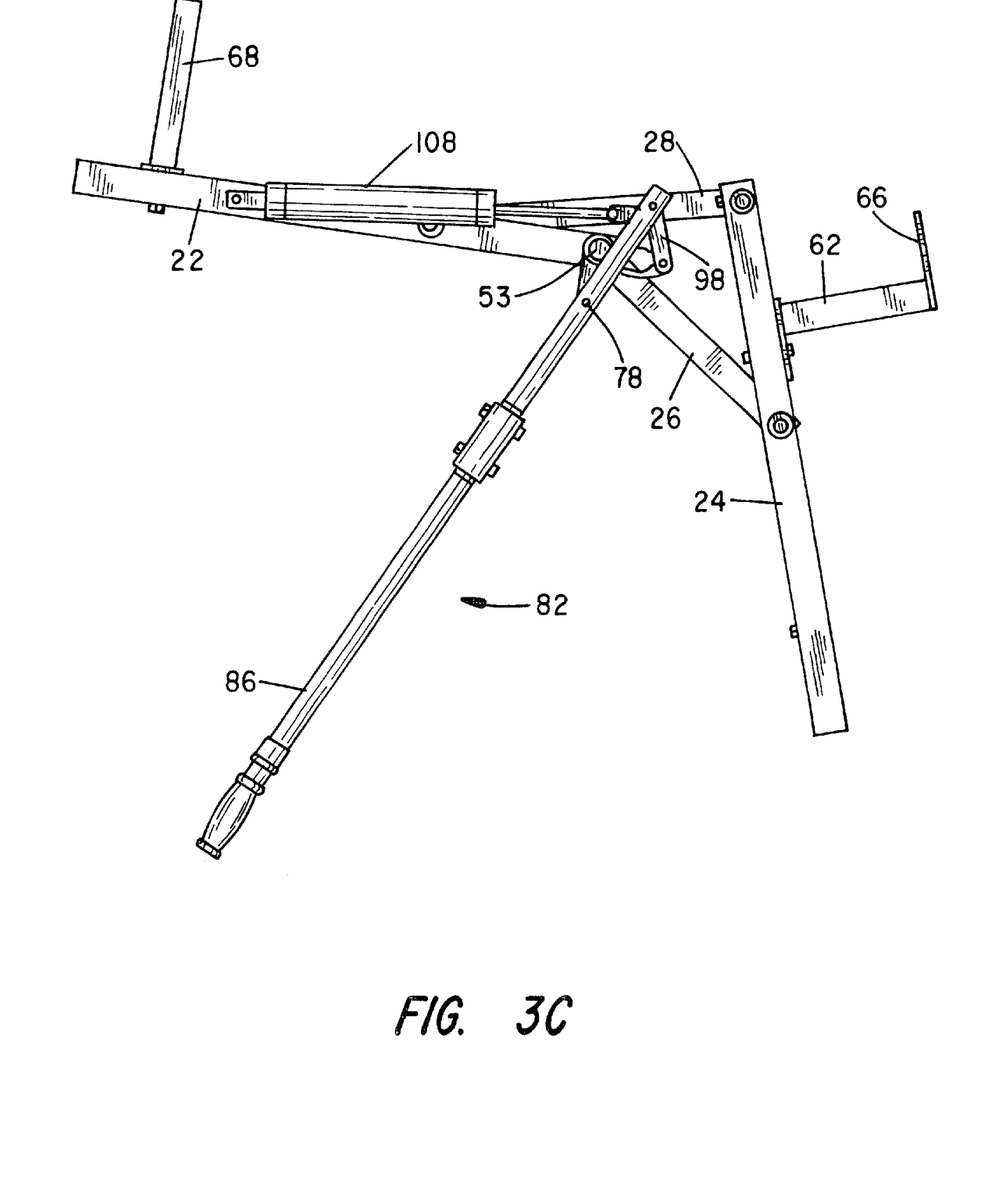
Figure 3D:
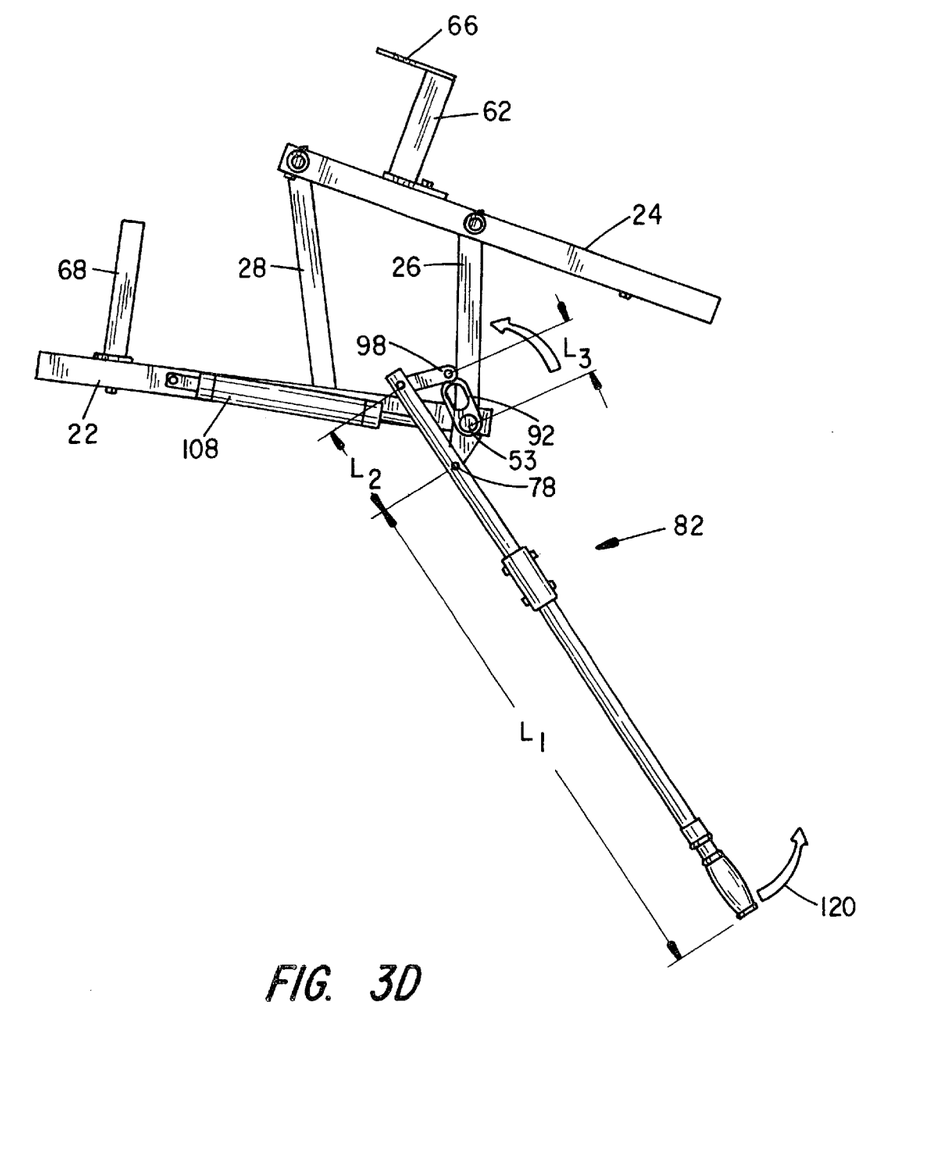

When it is desired to again return the ladders to the stowed position on the roof of the vehicle, the workman will suspend the ladder by one of its rails between the members 62 on the front and rear 4-bar linkage assemblies and then will move the lever 82, this time in the direction of arrow 120 (FIG. 3D). The force applied to the hand grip 118 is magnified by lever action and used to apply a rotational force to the connector rod 53, via the rotatable coupler 92. Specifically, rotation of lever 82 of about 70° will amplify and cause the coupler to rotate about 140°. One end of the slot 104 will engage the pin 106 to apply a torque to the connector rod 53 to rotate same in a counter-clockwise direction, thereby elevating the front and rear 4-bar linkages until the load passes through dead center, at which point the force of gravity continues to apply a counter-clockwise torque to the connector rod as the pin 106 traverses the length of the slot 104. Counteracting the force of gravity is the hydraulic cylinder 108 which causes the load to gently lower to the stowed position reflected in FIG. 3A.

It is important to note that with the lever actuating mechanism and rotatable coupler employed, the hand grip 116 always remains within reach of the operator in that it only swings between about a 225° point to a 315° point rather than between about 0° and about 180° as with my prior art design reflected in the '912 patent. It is therefore possible to use my rotating ladder rack on taller vehicles such as hi bay vans and the like.

To secure the lever 82 and to inhibit unauthorized use or theft of the ladders from the vehicle, there is provided a locking mechanism 122 that fastens to the rear of the vehicle and which includes an arcuate hook member 124 and a cooperating hasp 126 (FIG. 4) that is pivotally joined to the hook member 124. The lever segment 86 is dimensioned to fit within the arcuate hook and when the hasp is rotated to also partially surround the lever segment 86, an aperture 128 in the hasp aligns with a corresponding aperture 130 in the hook member 124, allowing a shackle of a padlock 132 to pass through the aligned apertures to secure the actuating lever in place. As is apparent from FIG. 1, when the lever 82 is locked in place in the manner described, the ladder's rail will be captured between members 62, 66 and 68 of the front and rear 4-bar linkages, preventing removal of the ladder until the latch mechanism 122, 124 is again unlocked.

Figure 4:
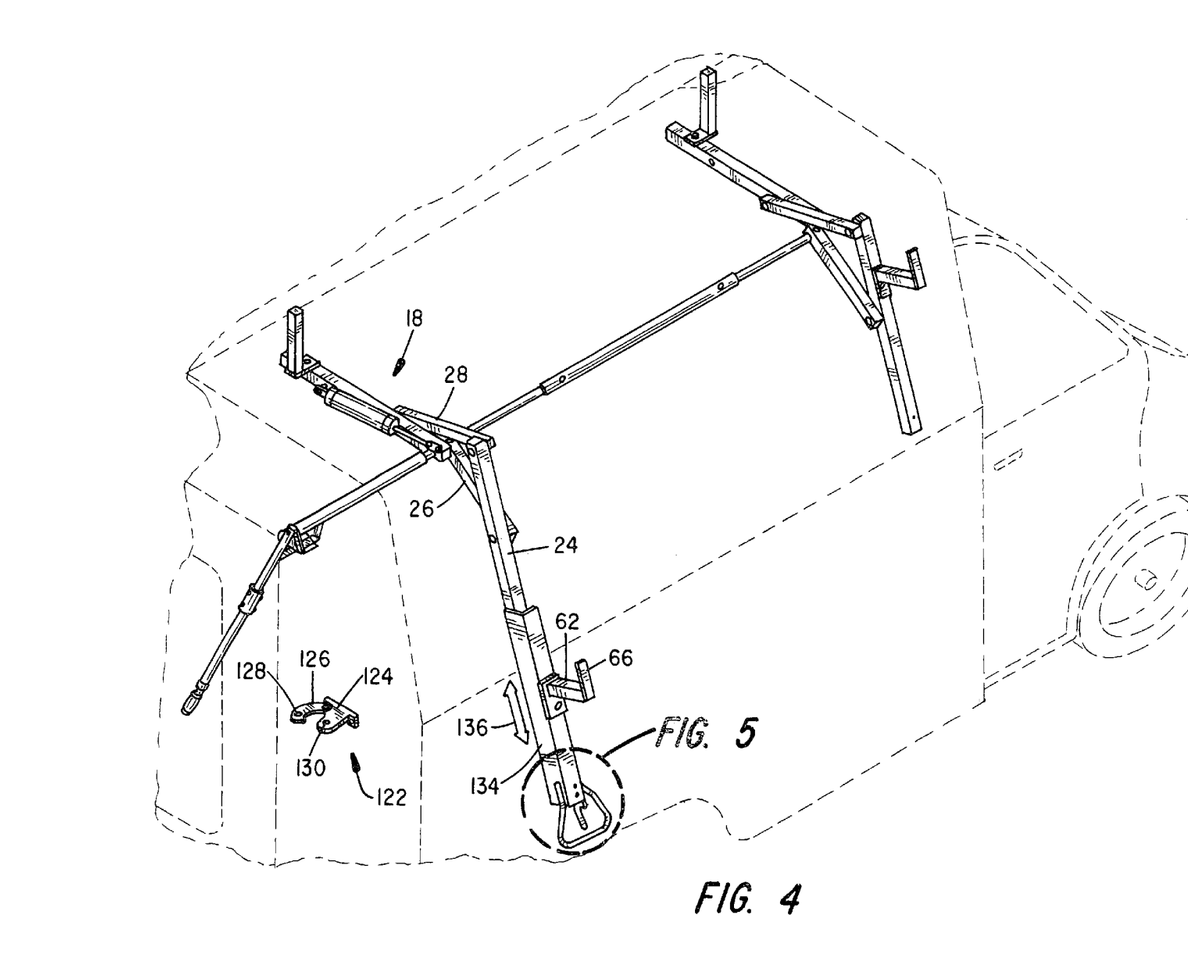
FIG. 4 is a perspective view illustrating an alternative embodiment.
Figure 5:
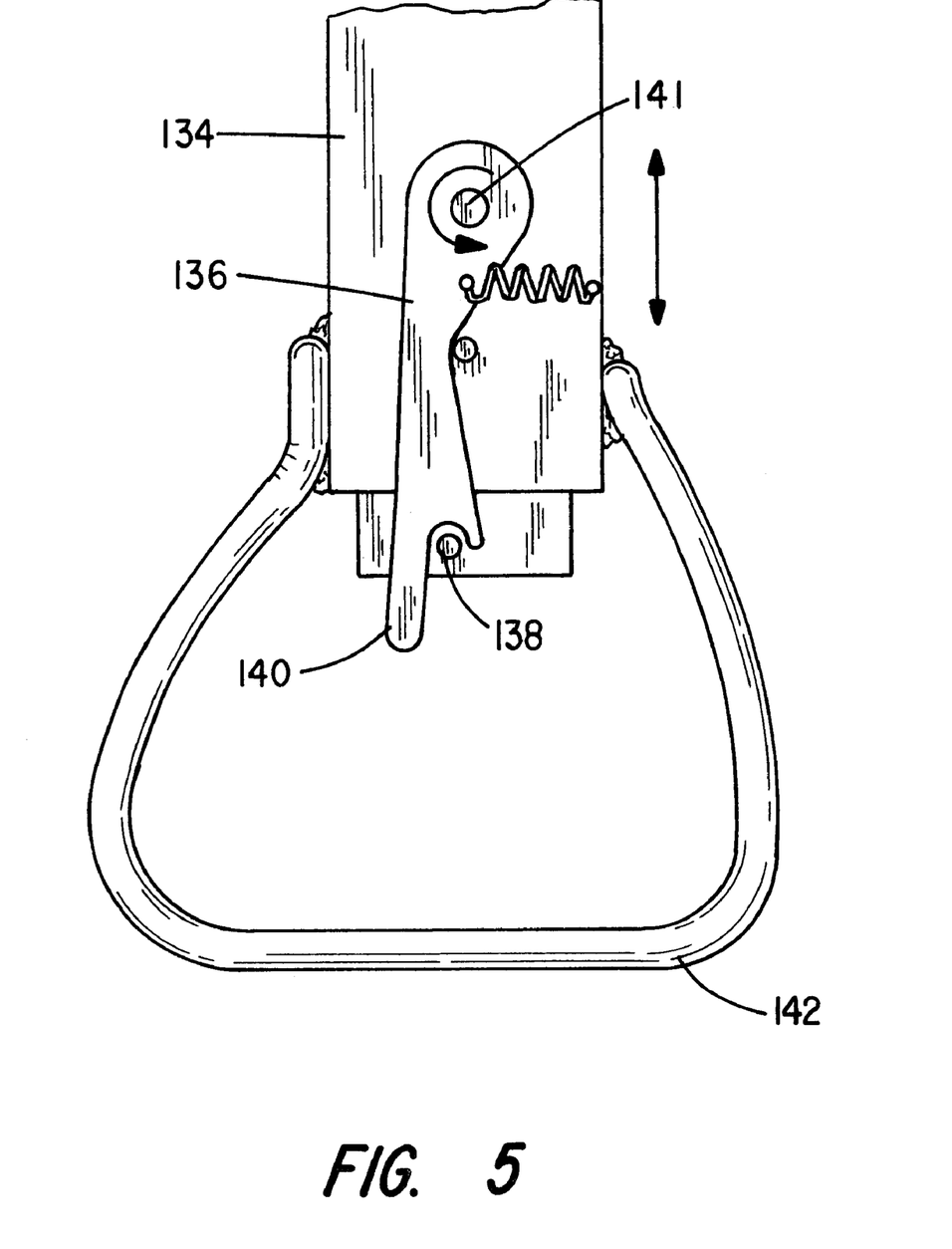
FIG. 5 is a partial, sectioned view showing a detail of the slide member of FIG. 4.

Turning next to FIGS. 4 and 5, an alternative embodiment of the invention is shown. In the arrangement depicted, the movable bar member 24 no longer has the post 62 and top plate 66 affixed to it, but instead, those parts are fastened to an angle bar member 134 that slides about the bar member 24 to permit the angle bar member 134 to slide longitudinally along the movable bar member 24 as indicated by the doubled-headed arrow 136. This allows one end of the ladder to be lowered a greater distance.

As shown more clearly in the partial, sectioned view of FIG. 5, the slidable outer angle bar member 134 is normally latched in its elevated disposition relative to the bar member 24 by a spring-loaded latch 136. The latch 136 has a notch formed therein that cooperates with a pin 138 affixed to the bar member 24. Only when the latch lever 140 is rotated clockwise about pivot pin 141 to thereby displace the latch 136 from engagement with the pin 138 can the angle bar 134 be lowered. A handle 142 is attached to the angle bar member 134 to facilitate a controlled lowering and return of that tubular extension.

In use, the lever 82 is first unlocked from the latch assembly 122 and swung clockwise in the manner already described to elevate, rotate and lower the ladders to a position alongside the vehicle. At this point, a ladder will be parallel to the ground. By next unlatching the spring-loaded latch member 136 from its engagement with the pin 138, the angle bar member 134 can be made to descend a further distance. A worker can then lift one end of the ladder from the post 62 of the rearmost 4-bar linkage 18 and bring it to rest on the ground. The worker may then walk forward toward the front of the vehicle, grasp the ladder and disengage its now upper end from the post 62 on the front most 4-bar linkage 20.

Returning the ladder to the vehicle's roof involves just the opposite steps. With the rear end of the ladder resting on the ground, the worker places the ladder rail on the post 62 of the front 4-bar linkage and then lifts the rear of the ladder until the ladder rail can be placed on the post 62 of the rear 4-bar linkage 18. He or she then raises the angle bar member 134 with the aid of the handle until the spring-loaded latch 136 again snaps over and engages the pin 138. Finally, the lever 82 is manipulated in the manner already described to reposition the ladder load on the vehicle's roof Placing the lever 82 into the latch assembly 122 and securing with a padlock completes the operation.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. Apparatus for facilitating the loading and unloading of a ladder from the roof of a motor vehicle, comprising, in combination:

(a) a first and a second 4-bar linkage assembly, each including a stationary bar member adapted for attachment to the roof of a motor vehicle in parallel, space-apart relation so as to extend transverse to the longitudinal axis of said motor vehicle and a moveable bar member comprising a ladder rest pivotally coupled to said stationary bar member by a pair of rigid links of unequal length, said pair of rigid links sized and positioned such that rotation of one of said pair of rigid links on each of said first and second 4-bar linkage assemblies results in said moveable bar member comprising said ladder rests moving between a first disposition which is generally parallel to said roof and a second disposition aligned with and spaced from one side of said vehicle;

(b) a connector rod extending longitudinally between said first and second 4 bar linkage assemblies with said connector rod journaled for rotation in said stationary bar member of each of said 4-bar linkage assemblies and operatively coupled to said one of said pair of rigid links in each of said 4 bar linkage assemblies;

(c) a lever pivotable about a fulcrum rigidly connected to the stationary bar member of the first 4-bar linkage assembly to define lever arms, $L_1$ and $L_2$, where $L_1$ is $>>L_2$; and (d) a rotatable coupler journaled for rotation about the connector rod and having a radially extending arm of a length, $L_3$, that is $<L_2$ pivotally joined by a link member to an end portion of lever arm $L_2$, said rotatable coupler cooperating with the connector rod to apply a torque to the connector rod only when a force is applied to lever arm, $L_1$, to pivot the lever through a predetermined angle less than about 45° from the vertical and amplify the rotation angle of the rotatable coupler to about 90°.

2. The apparatus as in claim 1 wherein the fulcrum is rigidly connected to the stationary bar member by a tube co-axially disposed about a portion of the connector rod, the connector rod being journaled for rotation within the tube.

3. The apparatus as in claim 1 and further including a pin extending diametrically outward from the connector rod that cooperates with the rotatable coupler to apply said torque to the connector rod.

4. The apparatus as in claim 3 wherein the rotatable coupler includes a circumferential slot extending over a predetermined arc and said pin is received within the circumferential slot.

5. The apparatus as in claim 4 wherein the length of the arc is dependent upon the height of the vehicle roof.

6. The apparatus of claim 1 and further including means securable to the motor vehicle for locking the lever to prevent rotation about the fulcrum when the movable bar member is in the first disposition.

7. The apparatus of claim 1 wherein the movable bar member of the first 4-bar linkage assembly is longitudinally extendable.

8. The apparatus of claim 1 wherein the movable bar member of the first 4-bar linkage assembly comprises a first segment that is pivotally coupled to said stationary bar member by said pair of links of unequal length and a second segment slidingly disposed on the movable bar member of the first 4-bar linkage assembly and slidable therealong.

9. The apparatus of claim 8 and further including a manually operable latch for releasably locking the second segment with the first segment.

10. An apparatus for applying torque to a connector rod of a rotatable ladder rack assembly for loading and unloading ladders onto and from the roof of a motor vehicle, comprising:

(a) a stationary frame member adapted to be attached to the roof of a motor vehicle;

(b) a ladder rack connector rod journaled for rotation in the stationary frame member;

(c) a rotatable coupler comprising a cylindrical portion having a longitudinal bore formed therethrough for receiving an end-most portion of the connector rod therethrough and a radially projecting arm of a length, $L_3$, the rotatable coupler journaled for rotation about the end-most portion of the connector rod and including a circumferential slot formed through the cylindrical portion and intersecting the longitudinal bore;

(d) a pin extending radially from the end-most portion of the connector rod into said slot;

(e) a lever pivotally mounted on a fulcrum affixed to the stationary frame member to define a first lever arm, $L_1$, and a second lever arm, $L_2$, where $L_1$ is $>>L_2$, and $L_2>L_3$; and (f) a link member pivotally coupled between the lever arm, $L_2$, and the radially projecting arm of the rotational coupler.

11. The apparatus as in claim 10 and further including:

a hydraulic cylinder operatively coupled between the stationary frame member and the connector rod for controllably resisting rotation of said connector rod.

* * * * *